United States Patent
Rubio et al.

(10) Patent No.: US 7,908,642 B2
(45) Date of Patent: Mar. 15, 2011

(54) POLICY STORE

(75) Inventors: Ramon Rubio, Downey, CA (US); Allison Kowell B. Bajo, Carson, CA (US); Yeongtau Louis Tsao, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 972 days.

(21) Appl. No.: 11/736,957

(22) Filed: Apr. 18, 2007

(65) Prior Publication Data

US 2008/0263635 A1 Oct. 23, 2008

(51) Int. Cl.
*H04L 29/06* (2006.01)
*H04L 9/32* (2006.01)
*G06F 21/00* (2006.01)
*G06F 7/04* (2006.01)

(52) U.S. Cl. .............. 726/2; 726/27; 713/161; 713/166; 713/168; 713/182

(58) Field of Classification Search .................. 713/182, 713/161, 166, 168; 725/25; 726/1, 2, 27
See application file for complete search history.

(56) References Cited

U.S. PATENT DOCUMENTS

| | | | |
|---|---|---|---|
| 6,668,322 B1 | 12/2003 | Wood et al. | |
| 6,691,232 B1 | 2/2004 | Wood et al. | |
| 6,892,307 B1 | 5/2005 | Wood et al. | |
| 6,957,261 B2 * | 10/2005 | Lortz | 709/226 |
| 7,380,271 B2 * | 5/2008 | Moran et al. | 726/4 |
| 7,574,745 B2 * | 8/2009 | Yoneyama | 726/27 |
| 7,640,574 B1 * | 12/2009 | Kim et al. | 726/1 |
| 2004/0010602 A1 * | 1/2004 | Van Vleck et al. | 709/229 |
| 2004/0205342 A1 * | 10/2004 | Roegner | 713/168 |
| 2005/0064182 A1 * | 3/2005 | Lunsford et al. | 428/354 |
| 2005/0182965 A1 * | 8/2005 | Murillo et al. | 713/201 |
| 2007/0136292 A1 * | 6/2007 | Ohara | 707/9 |

* cited by examiner

*Primary Examiner* — Nasser Moazzami
*Assistant Examiner* — Mohammad W Reza
(74) *Attorney, Agent, or Firm* — Canon U.S.A.,Inc., IP Division

(57) ABSTRACT

A method for obtaining resource restriction information of a client application's resource includes: receiving authentication information from one of a plurality of authentication modules; identifying a client application's resource and authentication module based on the received authentication information; locating a policy store that is associated with the identified client application's resource, the policy store containing resource restriction information for each of the plurality of authentication modules; and obtaining the resource restriction information associated with the identified authentication module from the policy store.

11 Claims, 5 Drawing Sheets

| RESOURCE INFORMATION | |
|---|---|
| POLICY ATTRIBUTE | VALUE |
| 301 RESOURCE | RESOURCE IDENTIFIER |
| 302 OWNER | USER IDENTIFIER / GROUP IDENTIFIER |
| 303 PDL JOB | ALLOWED / DENIED |
| 304 REMOTE SCAN JOB | ALLOWED / DENIED |
| 305 REMOTE PRINT JOB | ALLOWED / DENIED |

FIG. 3A

| RESOURCE RESTRICTION | |
|---|---|
| POLICY ATTRIBUTE | VALUE |
| 312 PERMISSION | ALLOWED / DENIED |
| 313 COLOR COPY LIMIT | 0-99999 |
| 314 COLOR SCAN LIMIT | 0-99999 |
| 315 COLOR PRINT LIMIT | 0-99999 |
| 316 GRAYSCALE COPY LIMIT | 0-99999 |
| 317 GRAYSCALE SCAN LIMIT | 0-99999 |
| 318 GRAYSCALE PRINT LIMIT | 0-99999 |

FIG. 3B

POLICY STORE

BACKGROUND OF THE INVENTION

1. Field of the Invention

The present invention relates generally to retrieving policy information, and more specifically to obtaining policy information based on a plurality of authentication modules.

2. Description of the Related Art

Networked devices such as multifunction peripherals (MFPs) are normally shared among multiple users. Authorized users of these network devices have specific login credentials for gaining access to these devices. By supplying an appropriate login credential to an authentication module, a user may gain access to the device. With the increasing functionalities supported by these devices (e.g., copying, scanning, printing, address book), an owner of the network device may desire to create device restrictions and access privileges to prevent unauthorized users from using device resource or accessing confidential information. For example, an owner of a networked copier may want to restrict access to the corporate address book to a group of authorized users. In another scenario, an owner may set up access privileges that limit a first user to make only grayscale copies while allowing a second user to make both grayscale and color copies.

Policy restrictions provide access control to resources on a device. The policy restrictions of device resources are typically associated with a login credential supplied to an authentication module. Therefore, by authenticating with the authentication module, the applications running on the device will be able to limit the access and functionality provided to the authenticated user based on the policy information associated with the login credentials. The policy restriction is typically in a format of an access control list (ACL). An ACL is a table that includes information regarding access rights that each user has to a particular resource, such as device restriction, address book, file directory or individual files, etc.

Many client applications today can be accessed through one or more authentication modules. Generally, each authentication module is associated with an ACL that contains policy restrictions for the authentication module. In a case in which the client application supports a plurality of authentication modules, the owner often has to create a separate ACL for each of the authentication module. Thus, it becomes a challenging task to maintain and manage policy information from these separate ACLs.

SUMMARY OF THE INVENTION

According to an aspect of the present invention, a system obtains resource restriction information of a client application's resource. The system includes an authentication unit configured to receive authentication information from one of a plurality of authentication modules. Based on the received authentication information, the client application identifies the user and the authentication module and locates a policy store that is associated with the identified resource. The policy store contains the resource restriction information for each of the plurality of authentication modules. The client application obtains the resource restriction information associated with the identified authentication module from the policy store.

Further features of the present invention will become apparent from the following description of exemplary embodiments (with reference to the attached drawings).

BRIEF DESCRIPTION OF THE DRAWINGS

FIG. 3A illustrates a table of resource information.

FIG. 3B illustrates a table of resource restrictions.

DESCRIPTION OF THE EMBODIMENTS

Exemplary embodiments of the present invention are described below with reference to the drawings.

Figure 1:
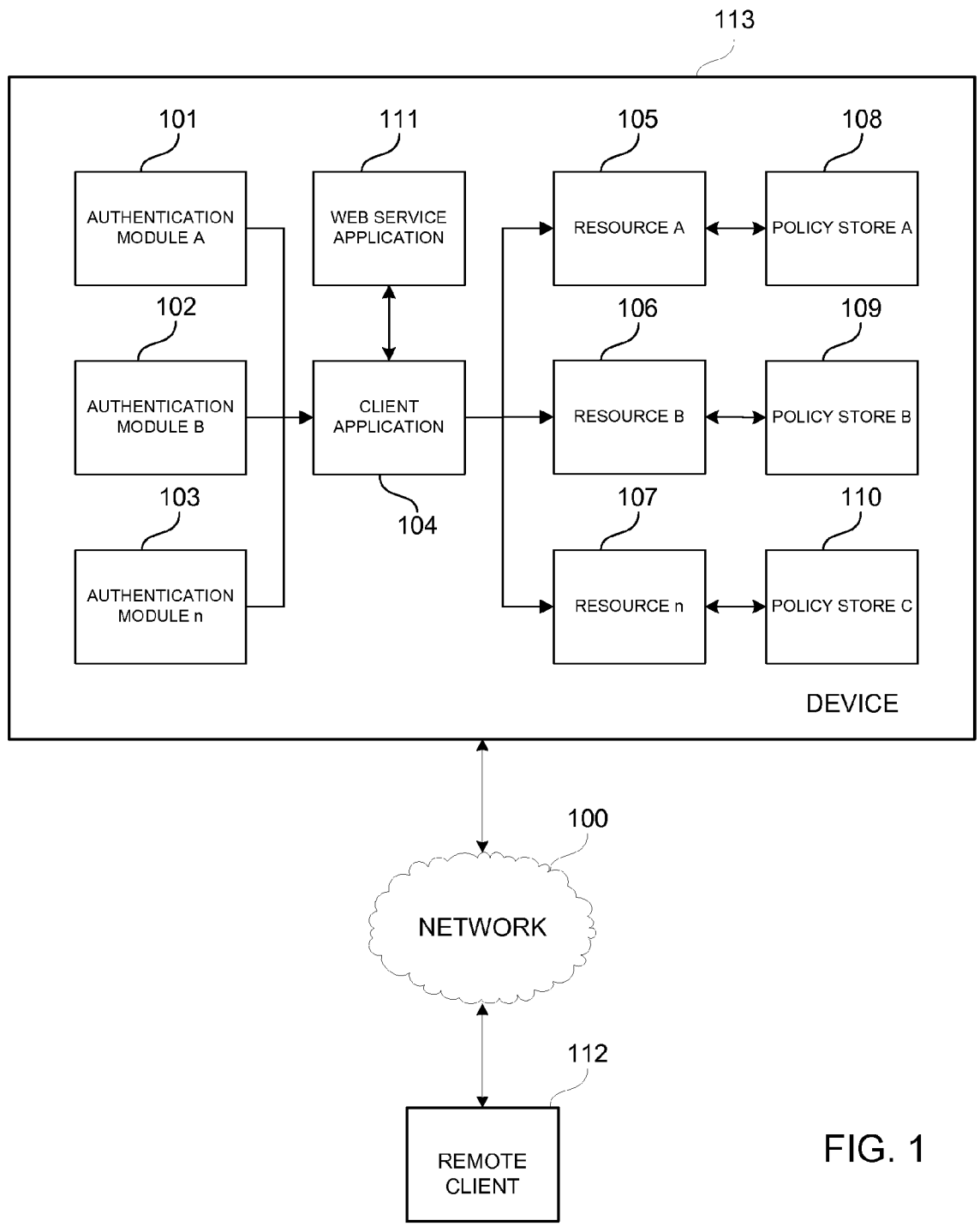
FIG. 1 illustrates an exemplary configuration of the overall system.

FIG. 1 illustrates an exemplary system configuration according to one embodiment of the present invention. The system includes a Device 113 that communicates with a Remote Client 112 via a Network 100. Network 100 is, for example, the Internet, however, any network that enables communication between Device 113 and Remote Client 112 may be utilized.

Device 113 generally supports a plurality of Authentication Modules, e.g., Authentication Module A 101, Authentication Module B 102 and Authentication Module n 103. In one embodiment, the Authentication Modules communicate with an external authentication server (not shown) for receiving authentication information. An authentication module may support an authentication application such as single sign-on (SSO), which is an authentication process where the client can enter one name and password, or equivalent credential information, and have access to a number of resources within the client application.

To receive login credential information from a user, the above authentication modules may include login units (not shown) that are embedded in Device 113 or externally connected to Device 113. The login units may include a magnetic stripe card reader, a smart card reader or a device that receives username and password supplied by a user.

In one embodiment, Authentication Module A 101 communicates with a Client Application 104. Client Application 104 contains a plurality of resources. The plurality of resources is illustrated in FIG. 1, e.g., resource A 105, resource B 106 and resources n 107. The present invention does not limit the number of resources controlled by Client Application 104. In addition, Resource A 105, Resource B 106 and Resource n 107 are associated with Policy Store A 108, Policy Store B 109 and Policy Store n 110, respectively. The resources shown in FIG. 1 may be, for example, a program controlled by client application 104, a sub-application within the client application 104, an address book or a directory controlled by Client Application 104. Policy stores will be explained in more detail below in connection with FIG. 2.

Figure 2:
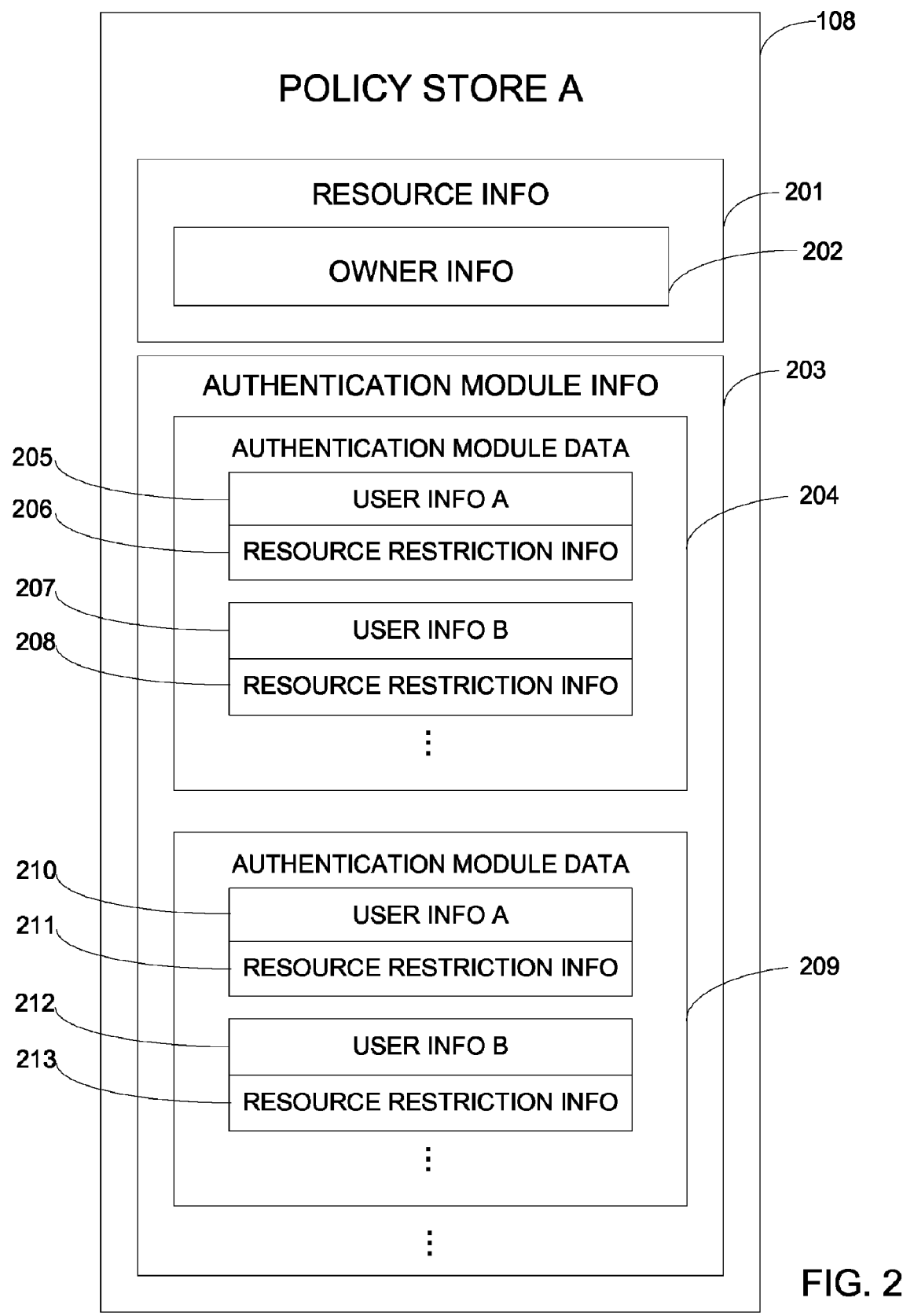
FIG. 2 illustrates an exemplary block diagram including components of the policy store.

FIG. 2 illustrates an exemplary block diagram including components of a policy store according to an embodiment of the present invention. While the example shown in FIG. 2 refers to Policy Store A 108, it also applies to Policy Store B 109 and Policy Store C 110. Policy Store A 108 contains Resource Info 201. Resource Info 201 contains a resource identifier that identifies which resource is associated with Policy Store A. In this example, Resource Info 201 contains the resource identifier of Resource A. In addition, Resource Info 201 contains Owner Info 202 of the current resource. Typically, each resource has a single owner, (i.e., administrator) or a group owner (i.e., information technology department). In a case in which the resource is owned by a single owner, the value of Owner Info 202 is a user identifier. In a case in which the resource is owned by a group owner, owner info 202 is a group identifier, or a plurality of user identifiers within that group.

The owner of resource A 105 has privilege to manage information within Policy Store A 108. For instance, the owner of resource A is capable of creating or modifying Authentication Module Info 203 either locally or remotely. Remote policy management will be explained in further detail below in connection with FIG. 4. In a case in which the owner logs on to device 113 locally, the owner can perform policy management by navigating through a series of user interfaces provided by Client Application 104.

Authentication Module Info 203 contains information for a plurality of authentication modules supported by Policy Store A 108. For illustrative purposes, Authentication Module Info 203 contains information for Authentication Module data 204 and Authentication Module data 209. Authentication Module Data 204 contains information regarding Authentication Module A 101 and Authentication Module 209 contains information regarding Authentication Module B 102. Both Authentication Module Data 204 and Authentication Module Data 209 contain User Info and Resource Restriction Info for each member (authorized user) of resource A.

In one embodiment, each member has his or her own set of Resource Restriction Info. For instance, User Info A 205 has an associated set of Resource Restriction Info 206 and User Info B 207 has a different set of Resource Restriction Info 208. Similar to Authentication Module Data 204, Authentication Module Data 209 has a separate set of User Info (i.e., 210 and 212) and corresponding Resource Restriction info (i.e., 212 and 213) for the User Info (210 and 212). As a result, if the user of User Info A 205 is authenticated using Authentication Module 204, Resource Restriction Info 206 will be retrieved. In another scenario, if User Info A 210 is authenticated using Authentication Module 209, Resource Restriction Info 211 will be retrieved. In this regard, Policy Store A enables a centralized location for storing policy information for a plurality of Authentication Module.

In another embodiment, each member may be assigned with an access level that is associated with an authentication module. Thereafter, according to the access level of the member, Resource Restriction Info is applied to the member. For instance, User A is assigned with resource restriction "level 1" associated with authentication Module A 101 and a resource restriction "level 2" associated with Authentication Module B 102. In this regard, when user A logs on to the device using Authentication Module A 101, a set of "level 1" resource restriction will be applied to User A. Similarly, if user A logs on using Authentication Module B 102, a set of "level 2" resource restriction will be applied.

As described above, Policy Store A 108 contains Resource Info 201. An exemplary resource information table is shown in FIG. 3A. For illustrative purposes, the table includes resource information of a multifunction peripheral (MFP). Policy Attributes of resource information contain functions that are supported by resource A. Resource 301 contains the resource identifier of the current resource. Owner 302 specifies the owner of a current resource. The value field of Owner 302 indicates the value expected for Owner 302, which is a user identifier or group identifier. PDL Job 303 specifies whether Client Application 104 permits jobs that are in Page Description Language (PDL) formats. The value expected from PDL Job 303 is "ALLOWED", when jobs in PDL format are permitted, or "DENIED", when PDL jobs are not permitted. Remote-Scan-Job 304 specifies whether Client Application 104 permits remote scan jobs. The value expected from Remote-Scan-Job 304 is "ALLOWED", when remote scan jobs are permitted, or "DENIED", when remote scan jobs are not permitted. Remote-Print-Job 305 specifies whether Client Application 104 permits remote print jobs. The value expected from Remote-Print-Job 305 is "ALLOWED", when remote print jobs are permitted, or "DENIED", when remote print jobs are not permitted.

Policy Store A 108 also contains resource restriction info (i.e., Resource Restriction Info 206). An exemplary table for resource restriction info is shown in FIG. 3B. For illustrative purposes, the table contains exemplary resource restriction info 206 of an MFP for User A 205. Resource Restriction Permission 312 indicates whether User A 205 has permission to access Resource A 105. The value expected from Resource Restriction Permission 312 is "ALLOWED", when User A 205 has permission to access Resource A, or "DENIED", when the User A 205 does not have permission to access Resource A 105.

FIG. 3B also includes Color-Copy-limit 313, Color-Scan-limit 314, Color-Print-Limit 315, Grayscale-Copy-limit 316, Grayscale-Scan-limit 317 and Grayscale-Print-Limit 318 and respective value fields 313 to 318 that contain a permissible amount of jobs (e.g., 0-99999) for User A 205. Color-copy-limit 313 allows the owner identified in Owner Info 202 to set the maximum number of color copies that User A 205 can make. Likewise, User A 205 is limited to the other resource restrictions specified in 313 to 318.

By using resource restrictions such as those shown in FIG. 3B, an owner may provide access control to each of the members. In one embodiment, policy store A 108 is in a format of an access control list (ACL). The ACL may be in a format of a markup language such as extensible markup language (XML). Each resource of Client Application 104 is associated with an ACL. The ACL includes all of the information described above in connection with Policy Store A 108. A policy store is not limited to an ACL, and any format that enables information storage such as a database may be employed.

The ACL can be remotely managed by a resource owner. The owner of a resource can perform a number of management tasks such storing, retrieving, importing and exporting an ACL via a network. In one embodiment, Web-Service Application 111 is installed on Device 113. The owner of a resource can execute a distributed management function on device 113 using the Web-Service Application 111 from Remote Client 112. To ensure secure connection is established between the remote client 112 and the device 113, a connection protocol such as Web-Service-Authentication protocol may be employed.

Figure 4:
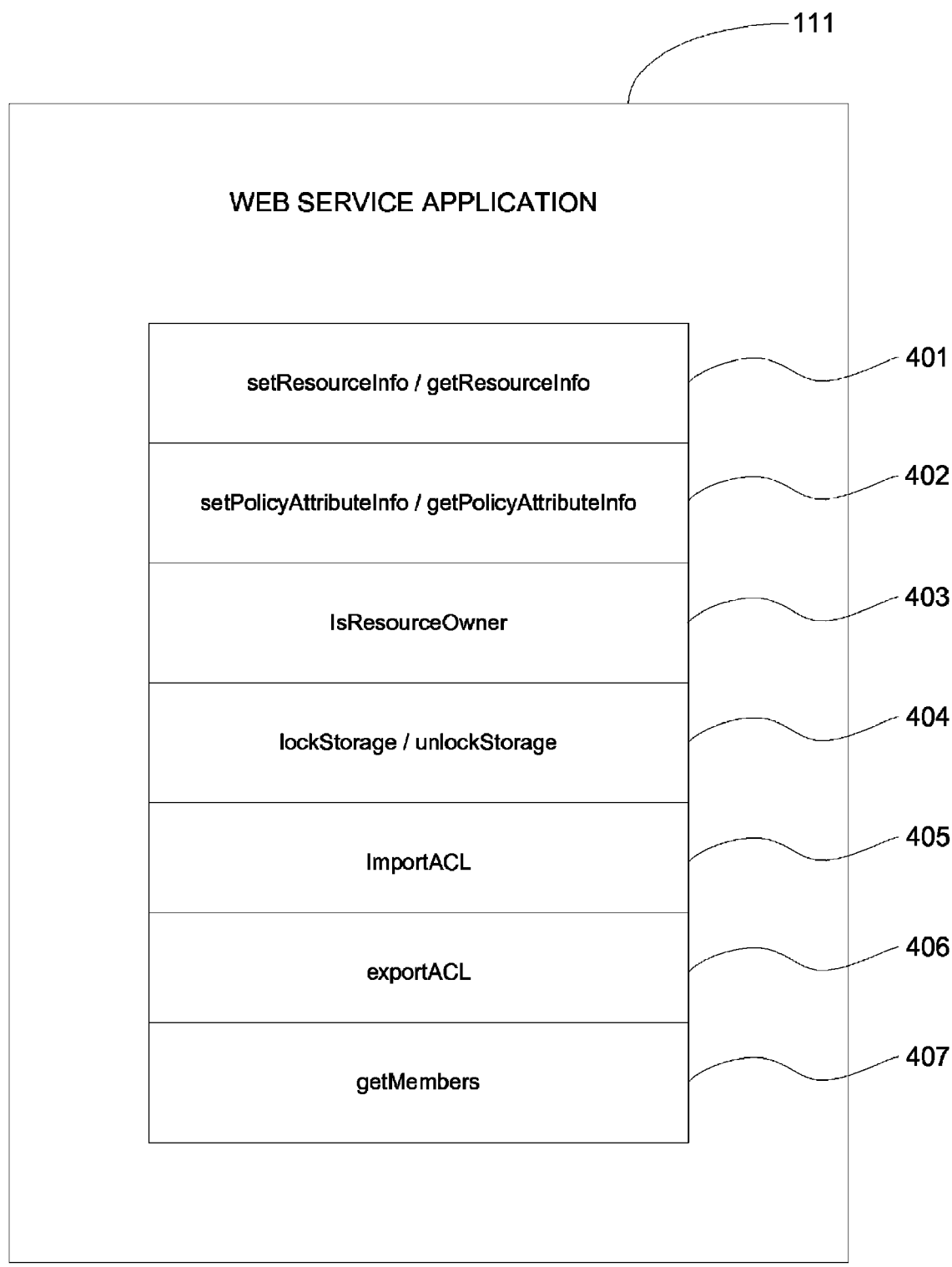
FIG. 4 illustrates various operations provided by the Web Service Application.

Web-Service Application 111 is capable of performing numerous management operations as shown in FIG. 4. For example, setResourceInfo and getResourceInfo 401 allow an owner to create and retrieve all information associated with the resource. setPolicyAttributeInfo and getPolicyAttributeInfo 402 operations allow an owner to create and retrieve all information associated with policy information for the active authentication module. isResourceOwner 403 operation checks whether the currently logged in remote user is the owner of the specified resource. The owner of a resource has privileges to manage information within the resource's policy store. lockStorage and unlockStorage 404 operation may lock or unlock a storage component of a device so that the storage component cannot be used by any other process. lockStorage may be utilized while importing or exporting policy storage so that other applications cannot access policy store information while the policy store is being imported or exported from the device. ImportACL 405 operation allows an owner to import ACL(s) from Remote Client 112. export-ACL 406 allows an owner to export ACL(s) to Remote Client 112.

getMembers 407 retrieves a list of members (e.g., users, groups, user types) that are known to Client Application 104. The list of members may also be obtained from an internal or external database. When this operation is executed, the member list is presented to the owner via a user interface. The owner may subsequently assign policy restrictions for each member in the member list.

Figure 5:
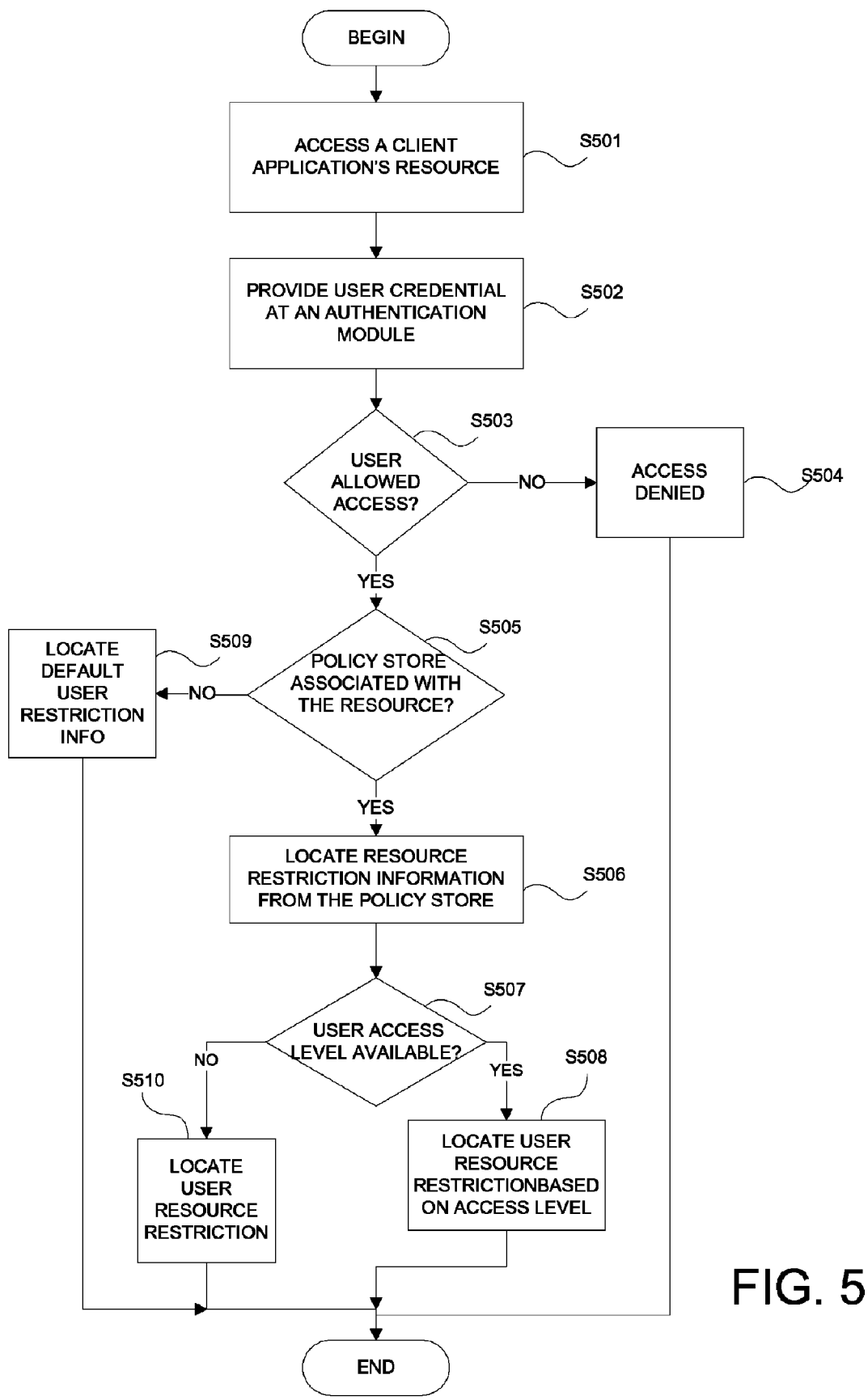
FIG. 5 illustrates an exemplary flow diagram of process steps to retrieve resource restriction information from a policy store.

FIG. 5 illustrates an exemplary flow diagram of process steps to retrieve resource restriction information from a policy store. The process begins with a request to access resource A of Client Application 104 in step S501. The user may supply the appropriate user credential at one of the plurality of trusted authentication modules either locally at the device or remotely at a remote client. Upon receiving the user credential in step S502, the authentication module authenticates the user based on the received user credential in step S503.

In a case where the user is not authenticated, the user will receive an access denial notification in step S504 and the process ends. In a case where the user is authenticated, Client Application 104 proceeds to locate a policy store associated with Resource A in step S505. Step S505 determines whether a policy store is associated with the resource. In a case where there is no policy store associated with resource A, a set of default policies is retrieved in step S509 and processing ends. If, however, a policy store associated with the Resource A is identified in step S505, processing proceeds to step S506.

The policy store contains resource restriction of Resource A for a plurality of authentication modules. Based on the type of authentication module login by the user, a set of resource restrictions associated with the authentication module are located by Client Application 104 in step S506.

Step S507 determines whether the user has an associated access level. In a case where a user access level is available, the flow proceeds to step S508 and a set of resource restriction information is obtained by Client Application 104 based on the user access level for resource A. Processing then ends. In a case where a user access level is not available, the flow proceeds to S510 and Client Application 104 obtains a set of resource restriction information based on the user credential supplied by the user during the login process. Processing then ends. Thus, as shown in the figures and described above, the present invention provides a single policy store that supports a plurality of authentication modules.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A method for obtaining resource restriction information of a client application's resource, the method comprising:
   receiving resource-specific authentication information from one of a plurality of authentication modules;
   identifying the client application's resource and method of authentication from the plurality of authentication modules to acquire authentication information;
   locating a policy store that is associated with the identified client application's resource, wherein the policy store contains the resource restriction information for each of the plurality of authentication modules;
   wherein the authentication information includes identification information which is associated with an access level and wherein the resource restriction information is obtained based on the access level associated with the identification information; and
   determining whether a resource restriction information is available for the identified authentication module,
   wherein if it is determined that the resource restriction information is available, the resource restriction information associated with the identified authentication module from the policy store is obtained, and
   wherein if it is determined that a resource restriction information is not available, a default resource restriction information defined by an owner of the resource is obtained.

2. The method according to claim 1, wherein the policy store is an access control list.

3. The method according to claim 1, wherein the policy store is stored at a remote location.

4. The method according to claim 1, wherein the policy store is managed by an owner remotely using a web service application.

5. The method according to claim 1, wherein the policy store is managed by an owner locally at a device.

6. A non-transitory computer-readable medium having stored thereon computer-executable instructions for performing a method comprising:
   receiving resource-specific authentication information from one of a plurality of authentication modules;
   identifying the client application's resource and method of authentication from the plurality of authentication modules to acquire authentication information;
   locating a policy store that is associated with the identified client application's resource,
   wherein the policy store contains the resource restriction information for each of the plurality of authentication modules;
   wherein the authentication information includes identification information which is associated with an access level and wherein the resource restriction information is obtained based on the access level associated with the identification information; and
   determining whether a resource restriction information is available for the identified authentication module,
   wherein if it is determined that the resource restriction information is available, the resource restriction information associated with the identified authentication module from the policy store is obtained, and
   wherein if it is determined that a resource restriction information is not available, a default resource restriction information defined by an owner of the resource is obtained.

7. A system for obtaining resource restriction information of a client application's resource, the system comprising:
   a receiving unit configured to receive resource-specific authentication information from one of a plurality of authentication modules;
   an identifying unit configured to identify the client application's resource and method of authentication from the plurality of authentication modules to acquire authentication information;
   a locating unit configured to locate a policy store that is associated with the identified client application's resource,
   wherein the policy store contains the resource restriction information for each of the plurality of authentication modules;
   wherein the authentication information includes identification information which is associated with an access level and wherein the resource restriction information is obtained based on the access level associated with the identification information; and a determining unit configured to determine whether a resource restriction information is available for the identified authentication module, wherein if it is determined that the resource restriction information is available, the resource restriction information associated with the identified authentication module from the policy store is obtained, and wherein if it is determined that a resource restriction information is not available, a default resource restriction information defined by an owner of the resource is obtained.

8. The system according to claim 7, wherein the policy store is an access control list.

9. The system according to claim 7, wherein the policy store is stored at a remote location.

10. The system according to claim 7, wherein the policy store is managed by an owner remotely using a web service application.

11. The system according to claim 7, wherein the policy store is managed by an owner locally at a device.

* * * * *